(12) United States Patent
Reuber et al.

(10) Patent No.: US 10,949,629 B2
(45) Date of Patent: Mar. 16, 2021

(54) REAL-TIME TRACKING OF PASSIVE IDENTIFICATION TAGS

(71) Applicant: Stephen Gould Corporation, Whippany, NJ (US)

(72) Inventors: Michael Anthony Reuber, Lake Charles, LA (US); Ryan Carlton Ledford, Sulphur, LA (US)

(73) Assignee: STEPHEN GOULD CORPORATION, Whippany, NJ (US)

( * ) Notice: Subject to any disclaimer, the term of this patent is extended or adjusted under 35 U.S.C. 154(b) by 0 days.

(21) Appl. No.: 16/477,397

(22) PCT Filed: Feb. 5, 2018

(86) PCT No.: PCT/US2018/016836
§ 371 (c)(1),
(2) Date: Jul. 11, 2019

(87) PCT Pub. No.: WO2018/160323
PCT Pub. Date: Sep. 7, 2018

(65) Prior Publication Data
US 2019/0377913 A1      Dec. 12, 2019

Related U.S. Application Data

(60) Provisional application No. 62/465,670, filed on Mar. 1, 2017.

(51) Int. Cl.
*G08B 5/22* (2006.01)
*G06K 7/10* (2006.01)
(Continued)

(52) U.S. Cl.
CPC .......... *G06K 7/10099* (2013.01); *G01S 5/02* (2013.01); *G06K 7/10475* (2013.01); *G06Q 10/08* (2013.01); *H04W 4/80* (2018.02)

(58) Field of Classification Search
CPC .......... G06K 7/10099; G06K 7/10475; G06K 17/0022; H04W 4/80; G01S 5/02; G06Q 10/08
(Continued)

(56) References Cited

U.S. PATENT DOCUMENTS

2006/0055552 A1    3/2006  Chung et al.
2007/0282482 A1   12/2007  Beucher et al.
(Continued)

FOREIGN PATENT DOCUMENTS

KR    10-2009-0000108    *  1/2007  ............. G06Q 10/08
KR    10-2008-0018065 A     2/2008
(Continued)

OTHER PUBLICATIONS

The International Bureau of WIPO, International Preliminary Report on Patentability for International Application No. PCT/US2018/016836, dated Sep. 12, 2019.
(Continued)

*Primary Examiner* — Tanmay K Shah
(74) *Attorney, Agent, or Firm* — Faegre Drinker Biddle & Reath LLP

(57) ABSTRACT

A monitoring device assigns at least one passive identification tag to an active identification tag, and stores, in a memory, associations between the active identification tag and the at least one passive identification tags assigned to the active identification tag. The monitoring device then receives one or more signals indicative of location of the active identification tag, and, based on the received one or more signals, tracks location of the active identification tag as the active identification tag moves in an active tracking area. The monitoring device further tracks location of the at least one passive identification tags, assigned to the active identification tag, based on i) the tracked location of the
(Continued)

active identification tag and ii) the association between the active identification tag and the assigned passive identification tag.

16 Claims, 7 Drawing Sheets

(51) Int. Cl.
  *H04W 4/80* (2018.01)
  *G01S 5/02* (2010.01)
  *G06Q 10/08* (2012.01)

(58) Field of Classification Search
  USPC .......................................................... 340/8.1
  See application file for complete search history.

(56) References Cited

U.S. PATENT DOCUMENTS

| | | | |
|---|---|---|---|
| 2007/0285241 A1* | 12/2007 | Griebenow | G06Q 10/08 340/572.1 |
| 2010/0073188 A1 | 3/2010 | Mickle et al. | |
| 2018/0039930 A1* | 2/2018 | Thomas | G06Q 10/06315 |

FOREIGN PATENT DOCUMENTS

| | | |
|---|---|---|
| KR | 10-2009-0000108 A | 1/2009 |
| KR | 10-2011-0054623 A | 5/2011 |
| WO | 2007/109241 A2 | 9/2007 |

OTHER PUBLICATIONS

Korean Intellectual Property Office, International Search Report and Written Opinion of the International Searching Authority in PCT/US2018/016836, dated May 18, 2018.

European Patent Office, Extended European Search Report for European Patent Application No. 18761377.3, dated Nov. 12, 2020.

* cited by examiner

REAL-TIME TRACKING OF PASSIVE IDENTIFICATION TAGS

CROSS-REFERENCES TO RELATED APPLICATIONS

This application claims the benefit of U.S. Provisional Patent Application No. 62/465,670, entitled "Real-Time Tracking of Passive RFID Tags," filed on Mar. 1, 2017, the disclosure of which is hereby expressly incorporated herein by reference in its entirety.

FIELD OF THE DISCLOSURE

The present disclosure relates generally to location technology, more particularly, to tracking location using identification tags.

BACKGROUND

A supply chain is a network between a company and its suppliers, both internal and external, to produce and distribute a specific product, and the supply chain represents the steps it takes to get the product or service to the customer. Supply chain management is a crucial process, because an optimized supply chain results in lower costs and a faster production cycle.

Asset management, broadly defined, refers to any system that monitors and maintains things of value to an entity or group. It may apply to both tangible assets such as buildings and to intangible assets such as human capital, intellectual property, and goodwill and financial assets. Asset management is a systematic process of deploying, operating, maintaining, upgrading, and disposing of assets cost-effectively.

By providing line of site to assets and identifying process constraints within a single user interface, it would be advantageous to provide an open platform in which new and/or pre-existing legacy programs can be managed and refined within a single user interface for both supply chain and asset management.

Currently, many assets (such as high-value hand tools) are tracked via identification tags, such as Radio Frequency Identification ("RFID") tags, where passive tags are attached to an asset and the location of such a tagged asset may be determined when queried by an active monitoring system comprising a transceiver with an antenna that is linked to a database. The active monitoring system may transmit a signal that queries the passive tag on the asset. The passive tag may then be energized by the signal and send a response, which is normally limited to a unique identifier such as an Electronic Product Code ("EPC"). The database may include information about the asset that corresponds to the unique identifier, such as part types, usage, serial number, time-in-service, or any other desired details about the asset. In addition, the active monitoring system may include enhanced location capabilities for locating the asset and corresponding passive tag, using known techniques such as triangulation or location fingerprinting based on signal strength.

In some supply chain and asset management systems, a particular asset will have a designated location, such as a table or locked cabinet. In the example of a locked cabinet, a user may have to use an identification badge to unlock and open the cabinet to access the asset. The monitoring system may determine that the asset has been removed from the cabinet by the user but has no other way of tracking the asset as real-time tracking of a passive tag is difficult in certain environments like manufacturing and repair facilities where radio signals are easily reflected. Similarly, in the case of an asset assigned to a table for storage, the monitoring system may include infrastructure at the table for determining if the asset has been removed (i.e., is either absent or present) but has no way of otherwise tracking the asset as it moves throughout the facility. Accordingly, it is desirable to supplement the capabilities of known passive monitoring systems to provide real-time tracking of assets moving through a repair or manufacturing facility.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

In an embodiment, a method for tracking location of passive identification tags includes assigning, with a monitoring device, at least one passive identification tag to an active identification tag, the active identification having a power source and an antenna. The method additionally includes storing, with the monitoring device in a computer memory, associations between the active identification tag and the at least one passive identification tags assigned to the active identification tag. The method further includes receiving, with the monitoring device, one or more signals indicative of location of the active identification tag, and tracking, with the monitoring device based on received one or more signals, location of the active identification tag as the active identification tag moves in an active tracking area. The method further still includes tracking, with the monitoring device, location of the at least one passive identification tags, assigned to the active identification tag, based on i) the tracked location of the active identification tag and ii) the association between the active identification tag and the assigned passive identification tag.

In another embodiment, a system comprising a database for storing identification data and a monitoring device coupled to the database. The monitoring device comprises one or more integrated circuits configured to assign at least one passive identification tag to an active identification tag, the active identification having a power source and an antenna. The one or more integrated circuits are also configured to store, in the database, associations between the active identification tag and the at least one passive identification tags assigned to the active identification tag. The one or more integrated circuits are additionally configured to receive one or more signals indicative of location of the active identification tag and track, based on received one or more signals, location of the active identification tag as the active identification tag moves in a tracking area. The one or more integrated circuits are further configured to track location of the at least one passive identification tags, assigned to the active identification tag, based on i) the tracked location of the active identification tag and ii) the association between the active identification tag and the assigned passive identification tag.

In still another embodiment, a tangible, non-transitory computer readable medium, or media, storing machine readable instructions that, when executed by one or more processors, cause the one or more processors to: assign at least one passive identification tag to an active identification tag, the active identification having a power source and an antenna; store, in a memory, associations between the active identification tag and the at least one passive identification tags assigned to the active identification tag; process one or more signals indicative of a location of the active identification tag; track, based on processing the one or more signals, location of the active identification tag as the active identification tag moves in an active tracking area; and track location of the at least one passive identification tags, assigned to the active identification tag, based on i) the tracked location of the active identification tag and ii) the association between the active identification tag and the assigned passive identification tag.

Further scope of applicability of the apparatuses and methods of the present disclosure will become apparent from the more detailed description given below. It should be understood that the following detailed description and specific examples, while indicating embodiments of the apparatus and methods, are given by way of illustration only, since various changes and modifications within the spirit and scope of the concepts disclosed herein will become apparent to those skilled in the art from the following detailed description

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

Figure 1:
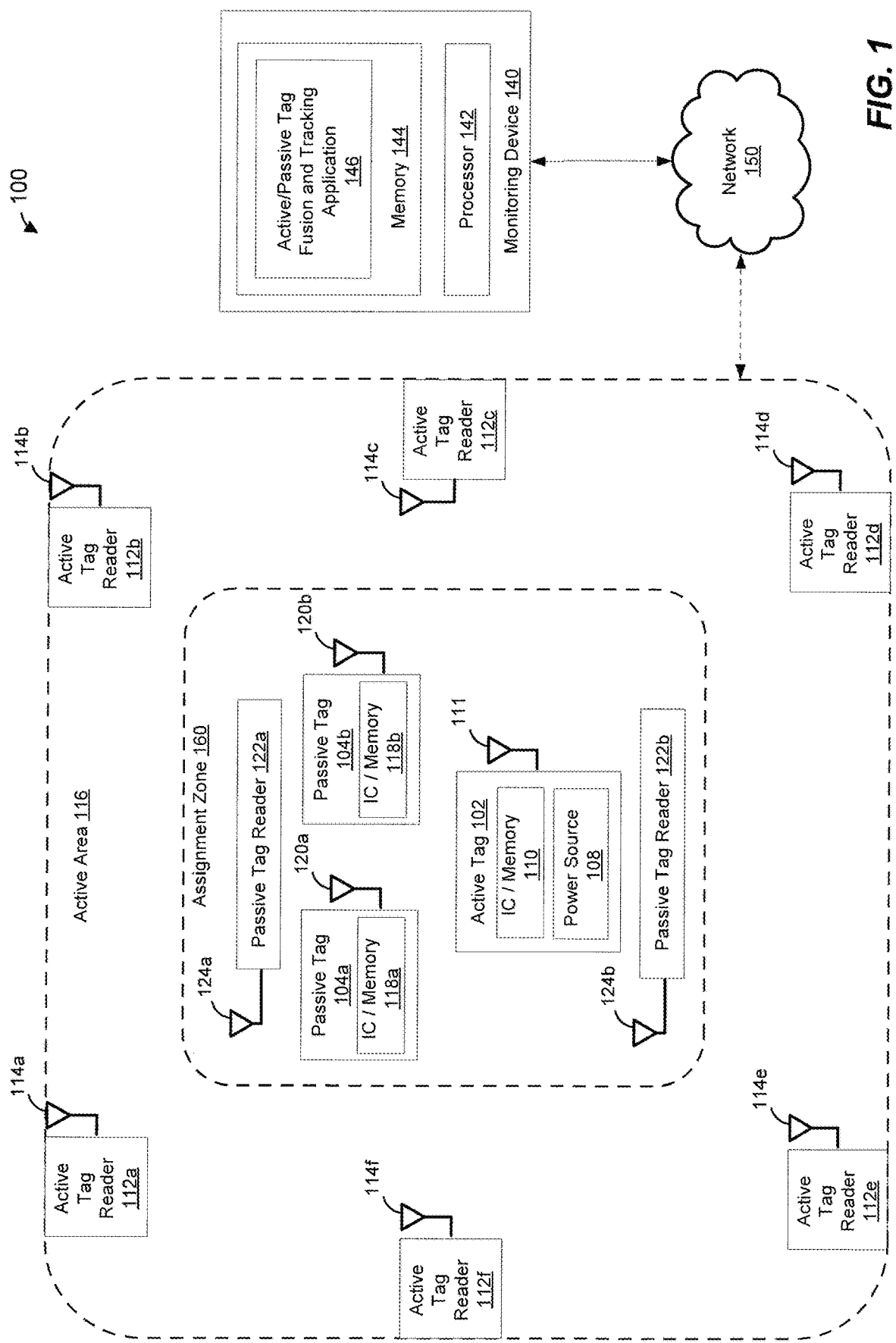
FIG. 1 is a block diagram of a monitoring system in which techniques for tracking passive identification tags using tracked location of active identification tags may be implemented, according to an embodiment.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

Active identification tags are known to provide real-time tracking capability, but Active identification tags need a power source, and thus, are often too large for practically tagging a number of assets. Accordingly, a system that combines the advantages of active and passive identification tag systems would provide an enhanced supply chain and asset management system by permitting real-time tracking with passive identification tags. Embodiments described below generally related to a novel process of tracking passive identification tags, in real-time, utilizing an integrated hardware/software system that allows a manual or automated process to assign one or more passive identification tags to an active identification tag, then tracking the active identification tag throughout a facility. The active identification tag may be associated with, for example, a user, a cart, or a bag carrying the asset. The process may include associating passive identification tag(s) to an active identification tag, each of which may have a unique identifying serial number or Electronic Product Code ("EPC") embedded within. As noted above, this unique identifier may be used to identify additional information via a database about the asset or user being tracked. The database and software associating passive identification tag(s) to a particular active identification tag can be hosted in any combination of hardware at the facility or remote hardware accessible via the Internet or other cloud-based system. Once the passive identification tags are assigned to an active identification tag, the active monitoring system may track the assets throughout the facility in real-time. The active monitoring system may include a user interface, provided on a dedicated device or as an application on a tablet or smartphone, to access the tracking infrastructure of the active monitoring system that monitors the passive identification tag(s) movement in relation to the movement of the corresponding assigned active identification tag.

FIG. 1 is a block diagram of a monitoring system 100 in which techniques for tracking passive identification tags using tracked location of active identification tags may be implemented, according to an embodiment. In various embodiments, monitoring system 100 may be a part of a management system such as an asset management system or a supply chain management system, in which monitoring system 100 may be utilized to account for and/or track assets or other items of value. As an example, monitoring system 100 may be utilized to track aircraft maintenance and repair tools or other assets in an airport hangar, in an embodiment. As another example, monitoring system 100 may be utilized to track parts or components in a production assembly line, such as automobile components in an automobile assembly line. In other embodiments, monitoring system 100 is utilized to track items in other scenarios, such as to track pharmaceuticals in a warehouse or to track equipment in a hospital, for example.

Monitoring system 100 may monitor assets of other items using active identification tags 102 and passive identification tags 104. In various embodiments, passive identification tags 104 may be attached to or embedded in assets, such as tools or assembly parts or components, and active identification tag 102 may be carried by or a user, such as an employee or other person, operating or handling the assets, attached to a bag or a cart for transporting the assets, or attached to a larger component of a product being assembled. As a more specific example, in an embodiment in which monitoring system 100 is configured to track tools or other assets in an airport or within an airport hangar, passive identification tags 104 may be attached to or embedded into airport equipment such as aircraft maintenance or repair tools, and active identification tag 102 may be attached to or embedded into a cart or a bag for carrying the aircraft maintenance or repair tools or may be attached to or carried by an employee or other person carrying or handling the aircraft maintenance or repair tools. As another example, in an embodiment in which monitoring system 100 is configured to track parts or components in an assembly line, passive identification tags 104 may be attached to or embedded in smaller parts or components, such as automobile parts, used in the assembly of a larger product, and active identification tag 102 may be attached to or embedded in a larger component of the product being assembled, such as an automobile chassis, for example.

Active identification tag 102 includes a power source 108, an integrated circuit/memory component 110, and an antenna 111. Power source 108 may comprise any suitable power supply, such as a battery. Power source 108 may be coupled to integrated circuit/memory component 110, and may provide energy for operating integrated circuit/memory component 110. In some embodiments, power source 108 may additionally be coupled to antenna 111, and may provide energy for operating one or more amplification stages that may be integrated with antenna 111. Integrated circuit component/memory component 110 may store identifying information, such as a unique identifier of active identification tag 102, or a unique identifier of an item or person to which active identification tag may be attached and/or with which active identification tag 102 may be associated. Integrated circuit/memory component 110 may be configured to generate and transmit signals via antenna 111 and, in some embodiments, process signals received via antenna 111. Transmitted signals may carry information stored in integrated circuit/memory component 110 and may allow detection and tracking of location of active identification tag 102 as active identification tag 102 throughout an area being monitored, such as, for example, an airport hangar or other facility. Active identification tag 102 may be, for example, a radio frequency identification (RFID) tag or a Bluetooth low energy (BLE) ID tag. In other embodiments, active identification tag 102 may be an identification tag that utilizes another suitable communication technology (e.g., Wi-Fi technology, infrared technology, ultrasound technology, etc.).

In operation, active identification tag 102 may periodically (e.g., every second, every several seconds, or with any other suitable transmission period) transmit a signal, such as a beacon, that may be received by one or multiple active tag readers 112, which may be equipped with antennas 114. Active tag readers 112 may be suitably positioned throughout an active tracking area 116 (sometimes referred to herein as simply "active area") being monitored by monitoring system 100. The beacon signal may carry identifying information, such as a unique identifier associated with the active identification tag 102, an identifier associated an employee or other person to which the active identification tag 102 is assigned, an identifier associated with a cart or bag to which the active identification tag 102 is attached, etc. One or more active tag readers 112 that receive the signal may, in turn, relay information carried by the signal and information related to reception of the signal (e.g., received signal strength) to a suitable location tracking device, such as an active tag reader controller (not shown) positioned in active area 116 and/or location monitoring device 140 positioned remotely from active area 116. Location tracking device may utilize such information to determine or approximate location of active identification tag 102, and may thus track a location of active identification tag 102 as it moves around the active area 116.

With continued reference to FIG. 1, passive identification tag 104 includes an integrated circuit/memory component 118 and an antenna 120. Integrated circuit/memory component 118 may store information such as, for example, information uniquely identifying passive identification tag 104 and/or information (e.g., EPC) uniquely identifying an asset or item to which passive identification tag 104 is attached or in which it is embedded. Unlike active identification tag 102, passive identification tag 104 typically does not include an internal power source. In operation, passive identification tag 104 may be interrogated by one or more passive tag readers 122 equipped with antennas 124, and passive identification tag 104 may be energized by electromagnetic energy transmitted by one or more passive tag readers 122. Once energized, passive identification tag 104 may transmit, via antenna 120, a signal that may identify passive identification tag 104 and may allow one or more passive tag readers 122 to detect presence of passive tag 104 in a vicinity of a specific passive tag reader 122. At least in part because passive identification 104 does not include an internal power source, passive identification tag 104 may be relatively smaller in size (e.g., 25% smaller, 50% smaller, 75% smaller, etc.) and may be less expensive than active identification tag 102. On the other hand, because passive identification tag 104 does not include an internal power source, antenna 124 of passive identification tag 104 does not include any amplification stages and may generally transmit weaker signals as compared to signals transmitted by antenna 111 of active identification tag 102.

Referring still to FIG. 1, monitoring device 140 may be a remote device, such as a computer or server positioned outside of active zone 104. Monitoring device 140 may be coupled to various devices inside active zone 104, such as active identification tag readers 112 (or active tag controllers) and passive identification tag readers 122 (or passive tag controllers) in active zone 104, via a communication network 150, for example. Communication network 150 may be a wide area network (WAN) such as the Internet, a local area network (LAN), or any other suitable type of communication network. In some embodiments, communication network 150 may be a single communication network or may be made up of multiple different communication networks. Location tracking device 140 may include a processor 142 and a computer-readable memory 144 that stores a passive/active tag fusion and tracking application 146 (sometimes referred to herein as simply "fusion and tracking application") in the form of computer-readable instructions, for example, that may be executable by the processor 142. Computer readable memory 144 may include volatile memory to store computer instructions and data on which the computer instructions operate at runtime (e.g., Random Access Memory or RAM) and, in an embodiment, persistent memory such as a hard disk, for example. In some embodiments, location tracking device or server 140 includes multiple processors 142. Further, in some embodiments, active/passive tag fusion application 146 may be implemented using hardware components, firmware components, software components, or any combination thereof.

In various embodiments, fusion and tracking application 146 is configured to assign one or more passive identification tags 104 to one or more active identification tags 102, and to then track location of the one or more passive identification tags 104 assigned to the active identification tag 102, based on tracked location of the active identification tag 102. In an embodiment, fusion and tracking application 146 may allow manual assignment of one or more passive identification tags 104 to one or more active identification tag 102, or may operate to automatically assign one or more passive identification tags 104 to one or more active identification tag 102. To implement automatic assignment of passive identification tag(s) 104 to active identification tag(s) 102, fusion and tracking application 146 may maintain a list (e.g., a table stored in a database) of one or more predetermined assignment or "Check Out" zones 160 within the active area 116. Fusion and tracking application 146 may additionally store associations between respective unique identifiers of assignment zones 160 and passive tag readers 122 positioned within close proximity to assignment zones 160. In operation, fusion and tracking application 146 may receive a signal from a passive tag reader 122, the signal identifying one or more passive tags 104 detected in an assignment zone 160. In an embodiment, a signal identifying one or more passive tags 104 may carry respective one or more identifiers of the one or more passive tags 104 detected in assignment zone 160. In response to receiving such signal from passive tag reader 122, fusion and tracking application 146 may detect or otherwise determine that an active identification tag 102 is currently also located within the same assignment zone 160. For example, fusion and tracking application 146 may determine that an active identification tag 102 is currently located within the same assignment zone 160 as one or more passive identification tags 104 based on tracked location of active identification tag 102 determined from signals received from active tag readers 112. Fusion and tracking application 146 may then assign the one or more passive identification tags 104 detected in assignment zone 160 to the active identification tag 102 detected to also be located in the same assignment zone 160. In an embodiment, fusion application 146 may assign one or more passive identification tags 104 to an active identification tag 102 by storing, in a memory, an association between identifier associated with active tag 102 (e.g., a unique identifier of active tag 102, or an identifier of an asset or a product, or an identifier of an employee or other person) and respective identifiers associated with the one or more passive identification tags 104.

Once one or more passive identification tags 104 are assigned to the active identification tag 102, fusion and tracking application 146 may track location of the one or more passive identification tags 104 based on tracked location of the active identification tag 102 as it moves throughout the active area 116. In an embodiment, fusion and tracking application 146 may track a location of the one or more passive identification tags 104 assigned to active identification tag 102 based on (i) tracked location of active identification tag 102 and (ii) stored associations between active identification tag 102 and the one or more passive identification tags 104. In some embodiments, fusion and tracking application 146 may log tracked location of one or more passive identification tags 104 relative to tracked location of active identification tag 102 in a memory, such as a database stored in the memory, and/or may cause tracked location of one or more passive identification tags 104 relative to tracked location of active identification tag 102 to be displayed via a user interface.

In some embodiments, subsequent to assignment of the one or more passive identification tags 104 to one or more active identification tags 102, fusion and tracking application 146 may de-assign passive identification tag(s) 104 from active identification tag(s) 102, for example when passive identification tag(s) 104 no longer need to be associated with active identification tag(s) 102. For example, fusion and tracking application 146 may allow manual de-assignment of passive identification tag(s) 104 from active identification tag(s) 102, or may operate to automatically de-assign one or more passive identification tag(s) 104 from active identification tag(s) 102. Passive identification tag(s) 104 manually or automatically de-assigned from active identification tag(s) 102 may subsequently be re-assigned to active identification tag(s) 102, and location of passive identification tag(s) 104 may then be tracked using tracked locations of active identification tag(s) 102 to which passive identification tag(s) 104 have been newly assigned.

FIGS. 2A-2D are diagrams illustrating an example process 200 of assigning, and then de-assigning, one or more passive identification tags to/from an active identification tag, according to an embodiment. In an exemplary embodiment, process 200 is implemented in conjunction with monitoring system 100 of FIG. 1. In other embodiments, process 200 is utilized with monitoring systems different from monitoring system 100 of FIG. 1. Similarly, monitoring system 100 of FIG. 1 implements a process different from process 200 to assign one or more passive identification tags to an active identification tags, in some embodiments. For ease of explanation, process 200 is described below with reference to monitoring system 100 of FIG. 1. Further, for ease of explanation, process 200 is described below in the context of tracking location of aircraft maintenance or repair tools in an airport hangar. In other embodiments, a process same as or similar to process 200 may be used to track location of other suitable items and/or in other suitable contexts.

Figure 2A:
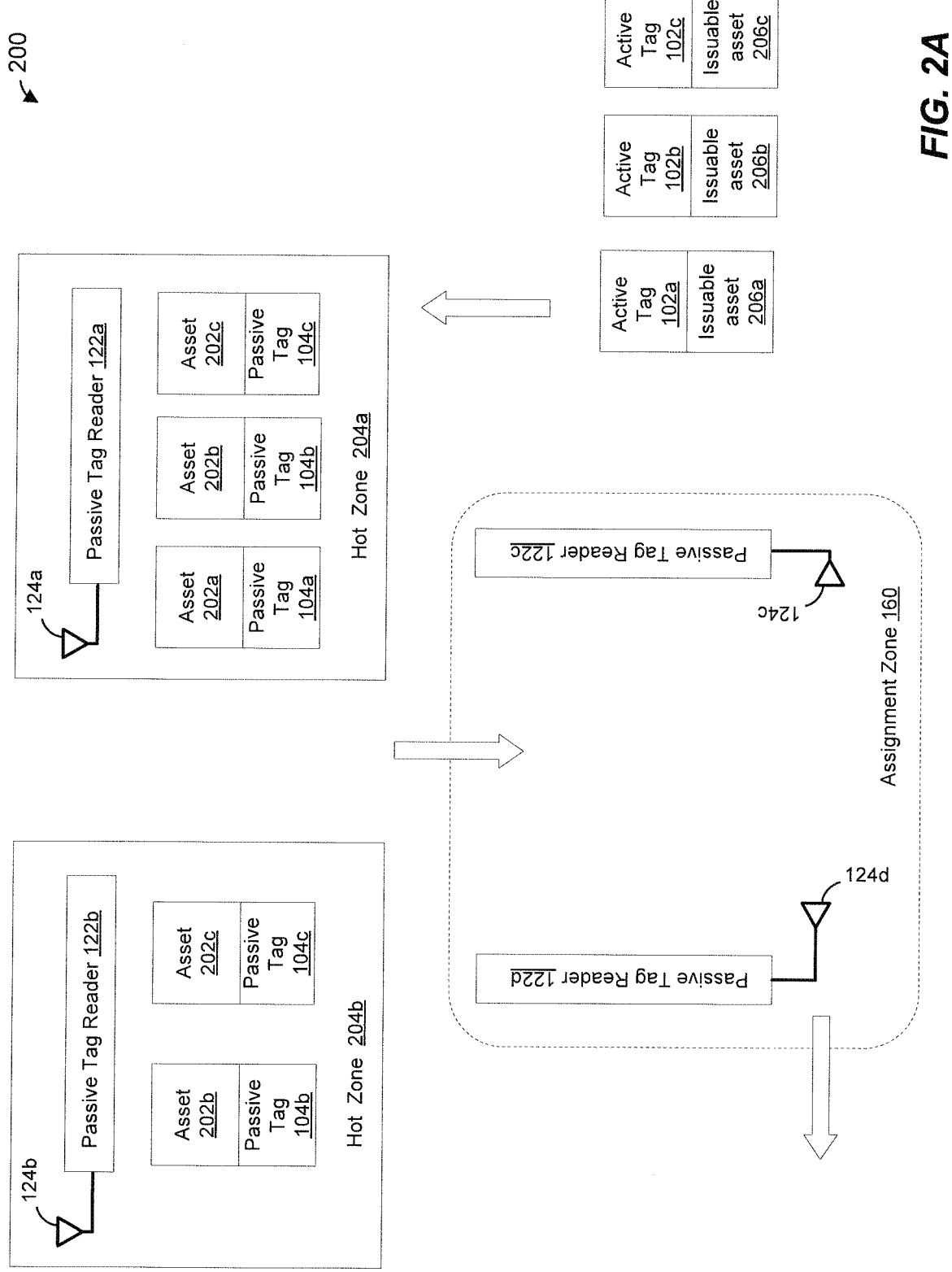
FIGS. 2A-2D are diagrams illustrating an example process of assigning, and then de-assigning, one or more passive identification tags to/from an active identification tag, in the monitoring system of FIG. 1, according to an embodiment.

Referring first to FIG. 2A, respective passive identification tags 104 of a plurality of passive identification tags 104 may be attached to or embedded in respective assets 202, such as aircraft maintenance or repair tools, which may initially be located in one or more "Hot Zones," "Hot Tables," "Hot Shelfs," or "Hot Racks" 204. In this case, "Hot" refers to any surface or area that is saturated with energy, such as Radio Frequency ("RF") signals or Bluetooth signals, which may be used to energize passive identification tags 104. The energy, such as RF signals or Bluetooth signals, are provided by passive tag identifier readers 122 and antennas 124 mounted above or below the surface of where the tagged asset is stored. A plurality of active identification tags 102 may be attached to, embedded in, or carried by, respective "issuable assets" such as employee badges, tool bags, or tool carts, for example.

One or more assets 202 tracked with respective one or more passive identification tags 104 are removed from Hot zone 204. In an embodiment, an employee or other person removes one or more assets 202 from Hot zone 204. In an embodiment, the employee or other person may be an issuable asset tagged by active identification tag 102. For example, the employee or other person may be wearing or carrying active identification tag 104, such as an active identification tag attached to or embedded in a badge or other item worn or carried by the employee or other person. As another example, the employee or other person may place the one or more assets 202 removed from Hot zone 204 in an issuable asset such as a bag or a cart that is tagged active identification tag 102. Generally, when an asset 202 is located in Hot zone 204, a status of the asset 202 is set to "Present" in a database accessible to and maintained by fusion and tracking application 146. When the asset 202 is removed from Hot zone 204, fusion and tracking application 146 may change status of the asset 202 to "Absent" to indicate that the asset 202 is no longer present in and is missing from Hot zone 204.

Figure 2B:
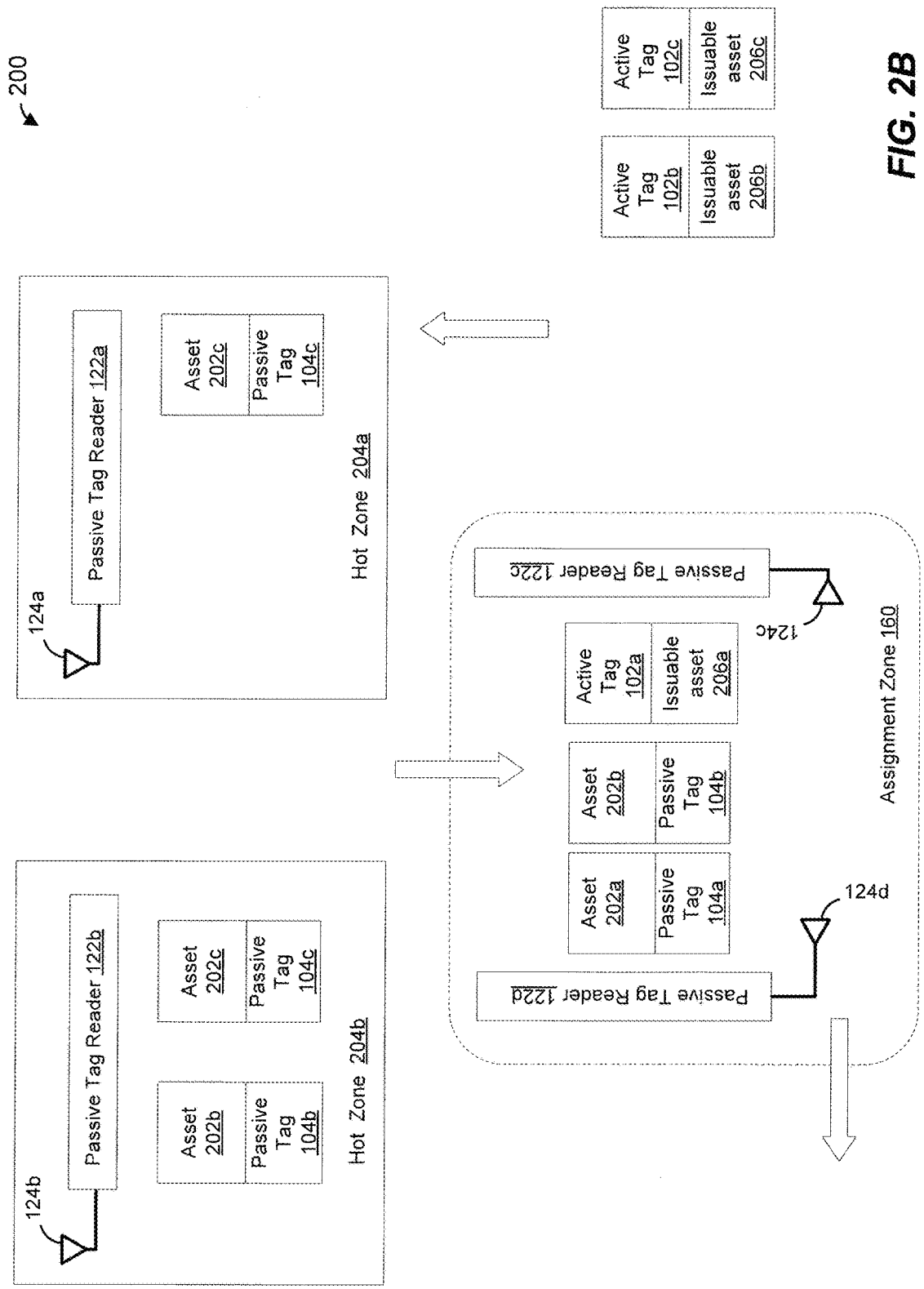

Referring now to FIG. 2B, assets 202a and 202b tagged, respectively, with passive tags 104a and 104b are removed from hot zone 204a. The tagged assets 202a and 202b are removed from hot zone 204a by an issuable asset 206a (e.g., an employee) tagged with active identification tag 102a or are placed in an issuable asset (e.g., a bag or cart) tagged with active identification tag 102a. Issuable asset 206a tagged with active identification tag 102a and the assets 202a, 202b tagged with passive identification tags 104a, 104b that were removed from Hot zone 204a enter assignment zone 160. One or more passive tag readers 122 equipped with antennas 124 may be located in or near assignment zone 160. The one or more passive tag readers 122 may detect presence of the passive identification tags 104a, 104b in the assignment zone 160. The one or more passive tag readers 122 may transmit one or more signals to monitoring device 140 indicating that the one or more passive identification tags 104a, 104b have been detected in assignment zone 160. For example, the one or more passive tag readers 122 may transmit one or more signals carrying unique identifiers associated with the one or more passive identification tags 104a, 104b detected in assignment zone 160. The one or more signals may also carry unique identifiers associated with the one or more passive tag readers 122 associated with assignment zone 160.

Although only a single assignment zone 160 is illustrated in FIGS. 2A-2D, monitoring system 100 may also include multiple assignment zones 160. In an embodiment, each of one or more assignment zones 160 is designated in fusion and tracking application 146 to have a certain position and a certain shape defined, respectively, by a position coordinate set and a shape attribute set. Position coordinate set of an assignment zone 160 may include an {x, y, z} coordinate set, and a shape attribute set including one or more of {type, radius, width, height, vertices} relevant to the particular shape of the assignment zone 160. For example, fusion and tracking application 146 may designate a circular assignment zone by defining (i) an x, y, z position of a center of a circle and (ii) a radius of the circle. Similarly, fusion and tracking application 146 may designate a rectangular assignment zone by defining (i) an x, y, z position of a center or a corner of a rectangle and (ii) a width and height of the rectangle. As another example, fusion and tracking application 146 may designate an polygonal assignment zone by defining (i) an x, y, z position of a center or a vertex of a polygon and (ii) a list of x, y, z positions of vertices of the polygon. As more specific example, fusion and tracking application 146 may define one or more of the following assignment zones 160 in the active area 116: (i) a first assignment zone 160 as a circular assignment zone identified by assignment zone Id 0: {Id: 0, position: {x: 0, y: 0, z: 0}, shape {type: "circle", radius: 10}, ii) a second assignment zone 160 as a rectangular assignment zone identified by assignment zone Id 1: {Id: 1, position: {x: 5, y: 5, z: 0}, shape {type: "rect", width: 40, height: 40}, ii) a third assignment zone 160 as a rectangular assignment zone identified by assignment zone Id 2: {Id: 2, position: {x: 0, y: 20, z: 0}, shape {type: "rect", width: 100, height: 55}, and iv) a fourth assignment zone 160 as a polygon assignment zone identified by assignment zone Id 3 as {Id: 3, position: {x: 10, y: 10, z: 0}, shape {type: "poly", vertices: [0, 0, 0], [20, 30, 0], [40, 0, 0]]}. In an embodiment, fusion and tracking application 146 may associate each defined active zone 160 with a unique active zone identifier and may further associate each unique active zone identifier with one or more unique identifiers of passive tag readers 122 located in or near the respective assignment zones 160.

In operation, when a signal indicating that a particular passive identification tag 104 has been detected in a particular assignment zone 160, fusion and tracking application 146 may determine, based on an identifier of a passive tag reader 122 from which the signal was received, in which particular assignment zone 160 the passive identification tag 104 was detected. Fusion and tracking application 146 may then detect one or more active identification tags 102 that are currently located on the particular assignment zone 160. For example, fusion and tracking application 146 may utilize tracked locations of a plurality of active identification tags 102 in monitoring system 100 to determine if one or more of the active identification tags 102 are currently location in the particular assignment zone 160. In the example scenario illustrated in FIG. 2B, fusion and tracking application 146 may receive signals indicating that passive identification tags 104a, 104b were detected in assignment zone 160. In response to receiving the one or more signals, fusion and tracking application 146 may determine that active identification tag 102a is currently located in assignment zone 160, and may then assign passive identification tags 104a, 104b to active identification tag 102a. For example, fusion and tracking application 146 may assign passive identification tags 104a, 104b to active identification tag 102a by storing, in a memory (e.g., in a database) associations between a unique identifier associated with active identification tag 102a and unique identifiers associated with passive identification tags 104a, 104b. In an embodiment, prior to assigning passive identification tags 104a, 104b to active identification tag 102a, fusion and tracking application 146 may check status of passive identification tags 104a, 104b to ascertain that passive identification tags 104a, 104b are marked as "Absent". Generally, in an embodiment, one or more passive identification tags 104 can be assigned to an active identification tag 102 so long as the one or more passive identification tags 104 and the active identification tag 102 have or are associated with unique identifiers.

Figure 2C:
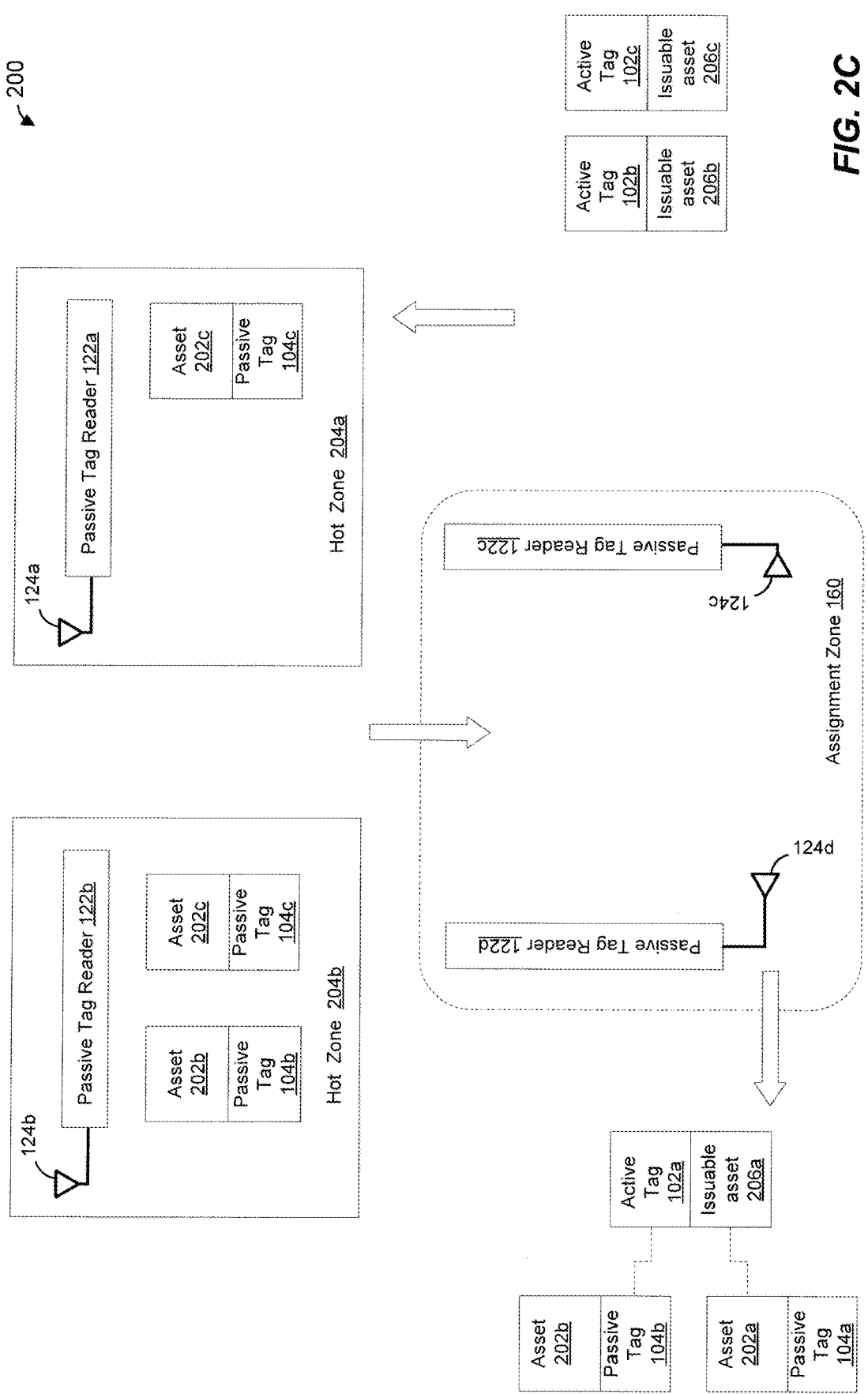

Referring now to FIG. 2C, when passive identification tags 104a, 104b and active identification tag 102 exit assignment zone 160, the passive identification tags 104a, 104b remain assigned to the active identification tag 102a in monitoring device 140. Generally, once one or more passive identification tags 104 are assigned to an active identification tag 102, fusion and tracking application 146 may track assets 202 associated with the one or more passive identification tags throughout the active area 116 in real-time based on tacked location of active identification tag 104 and associated asset 206. Thus, for example, fusion and tracking application 146 may track location of assets 202a, 202b, tagged by passive identification tags 104a, 104b, based on tracked location of active identification tag 102a and associated issuable asset 206a. In various embodiments, may log tracked location of assets 202a, 202b, tagged by passive identification tags 104a, 104b relative to tracked location of active identification tag 102a and associated issuable asset 206a in a memory, such as a database stored in the memory, and/or may cause tracked location of assets 202a, 202b, tagged by passive identification tags 104a, 104b relative to tracked location of active identification tag 102a and associated issuable asset 206a to be displayed via a user interface and a display that may be included on or coupled to monitoring device 140.

Figure 2D:
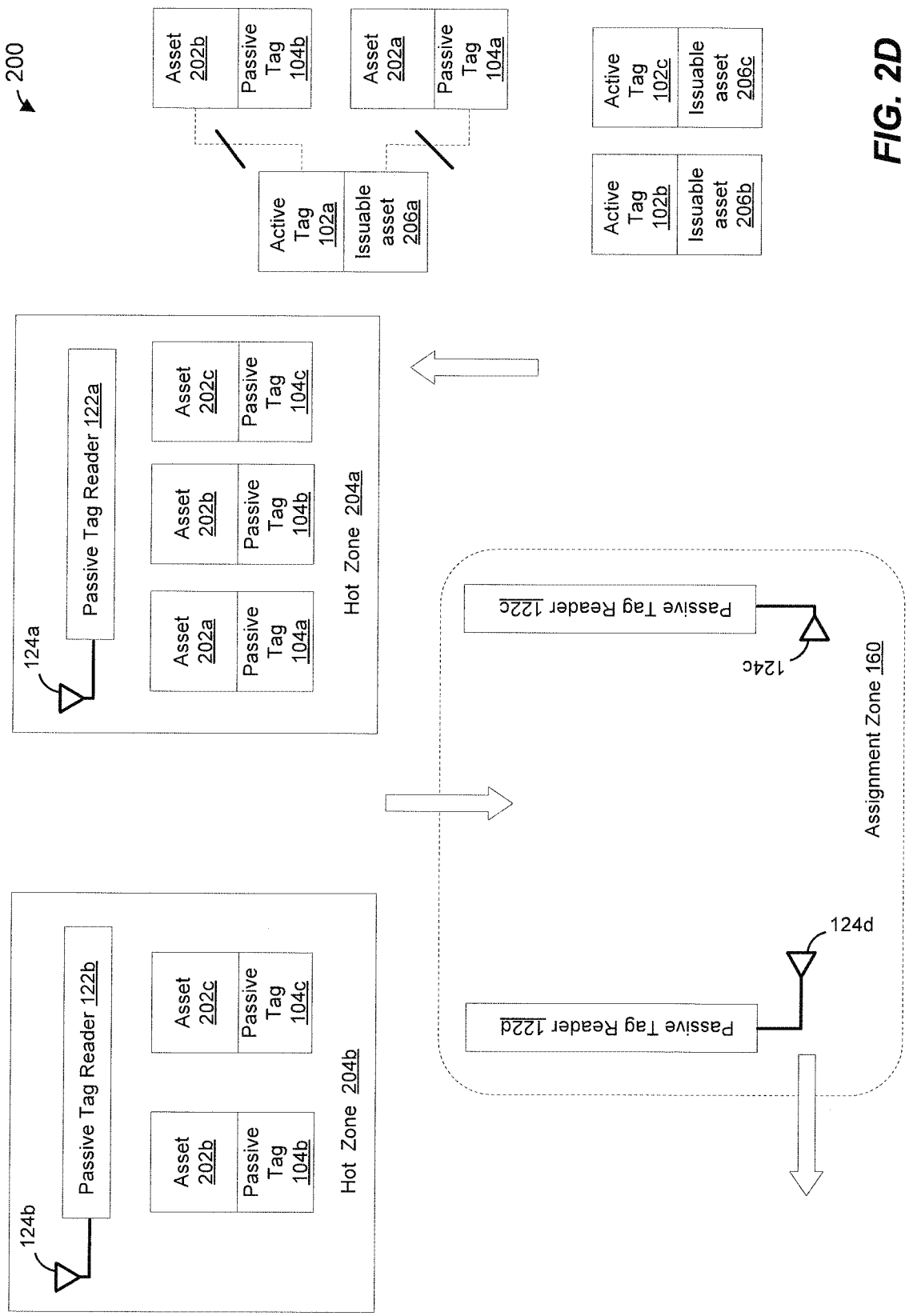

Referring now to FIG. 2D, when the assets 202a, 202b are returned to the Hot zone 204a, the passive identification tags 104a, 104b are "unassigned" from or disassociated with the active identification tag 102a and the asset is then designated as "Present" in the Hot zone 204a by the monitoring system 100. That way, the asset 202a, 202b may be re-assigned to an active identification tag 104. For example, if asset 202a and/or 202b is later removed from the Hot zone 204a by issuable asset 206b (or placed in issuable asset 206b), the removed asset 202a and/or 202b may then be assigned to active identification tag 102b and location of the removed asset 202a and/or 202b may be tracked based on tracked location of active identification tag 102b, in an embodiment.

Figure 3:
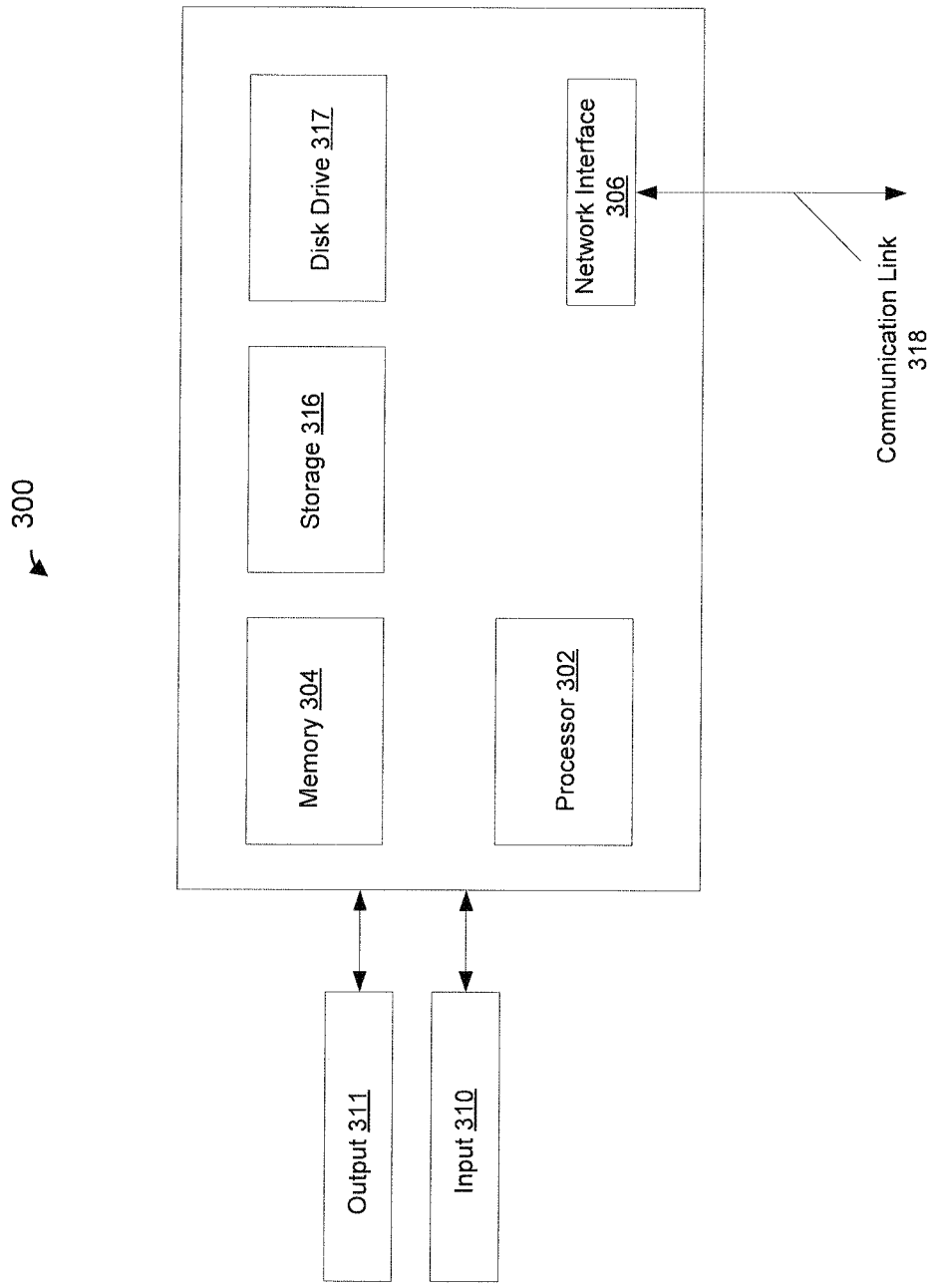
FIG. 3 is a block diagram of a computer system suitable for implementing one or more components of the monitoring system of FIG. 1, according to an embodiment.

FIG. 3 is a block diagram of a computing system 300 suitable for implementing one or more embodiments of the present disclosure. In an embodiment, monitoring device 140 of monitoring system 100 of FIG. 1 may be implemented as the computing system 300. In its most basic configuration, the computing system 300 may include at least one processor 302 and at least one memory 304. The computing device 300 may also include a bus (not shown) or other communication mechanism for communicating information data, signals, and information between various components of computer system 300. Components may include an input component 310 that processes a user action, such as selecting keys from a keypad/keyboard, selecting one or more buttons or links, etc., and sends a corresponding signal to the at least one processor 302. Components may also include an output component, such as a display, 311 that may display, for example, results of operations performed by the at least one processor 302. A transceiver or network interface 306 may transmit and receive signals between computer system 300 and other devices, such as user devices that may utilize results of processes implemented by the computer system 300. In one embodiment, the transmission is wireless, although other transmission mediums and methods may also be suitable.

The at least one processor 302, which can be a microcontroller, digital signal processor (DSP), or other processing component, processes these various signals, such as for display on computer system 300 or transmission to other devices via a communication link 318. The at least one processor 302 may also control transmission of information, such as cookies or IP addresses, to other devices. The at least one processor 302 may execute computer readable instructions stored in the memory 304. The computer readable instructions, when executed by the at least one processor 302, may cause the at least one processor 302 to implement processes associated with assigning passive identification tags to active identification tags, and then tracking location of passive identification tags using tracked location of active identification tags, in some embodiments.

Components of computer system 300 may also include at least one static storage component 316 (e.g., ROM) and/or at least one disk drive 317. Computer system 300 may perform specific operations by processor 312 and other components by executing one or more sequences of instructions contained in system memory component 314. Logic may be encoded in a computer readable medium, which may refer to any medium that participates in providing instructions to the at least one processor 302 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 316, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Figure 4:
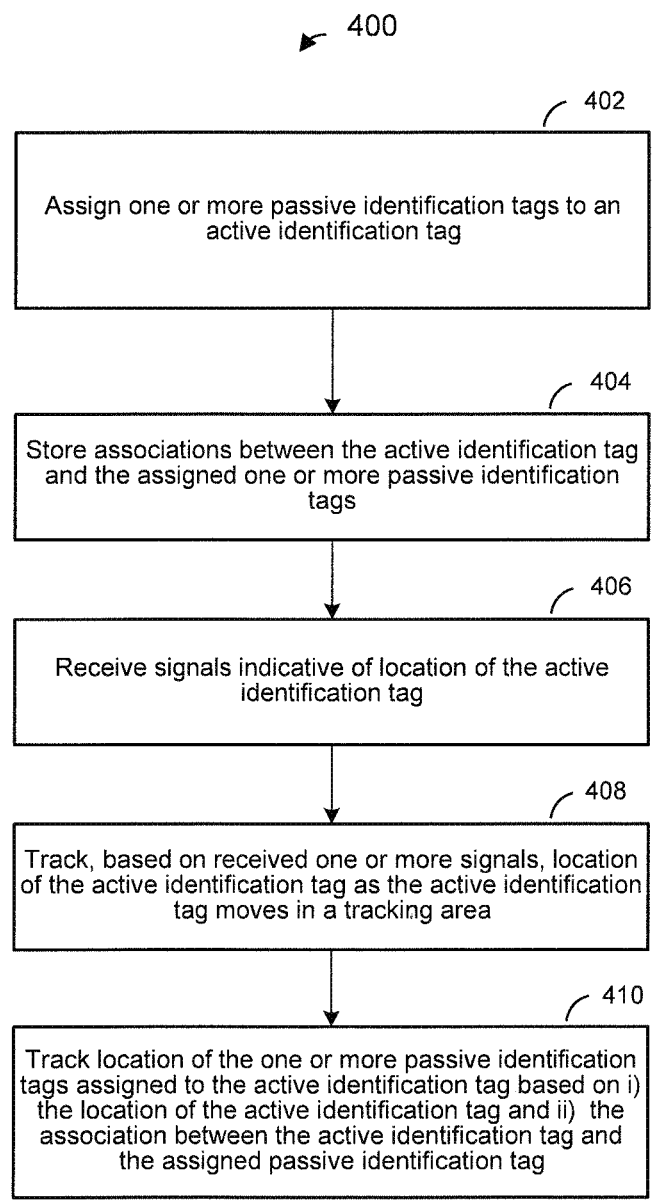
FIG. 4 is a flow diagram of an example method for tracking location of passive identification tags, according to an embodiment.

FIG. 4 is a flow diagram of an example method 400 for tracking location of passive identification tags, according to an embodiment. In an embodiment, method 400 is implemented in location tracking system 100 of FIG. 1. For example, method 400 is implemented by location tracking device 140 of tracking system 100 of FIG. 1. In other embodiments, method 400 is implemented by location tracking devices different from location tracking device 140 of FIG. 1 and/or in a suitable location tracking systems different from location tracking system 100 of FIG. 1.

At block 402, one or more passive identification tags are assigned to an active identification tag. For example, referring to FIG. 1, monitoring device 140 (e.g., fusion and tracking application 146 of monitoring device 140) assigns one or more passive identification tags 104 to an active identification tag 102. In an embodiment, monitoring device 140 utilizes process 200 illustrated in FIGS. 2A-2D to assign one or more passive identification tags 104 to an active identification tag 102. In another embodiment, a device different form monitoring device 140 and/or a process different from process 200 is used to assign the one or more passive identification tags to the active identification tag.

At block 404, associations between the active identification tag and the one or more passive identification tags assigned to the active identification tag at block 402 are stored in a memory, such as in a database. For example, monitoring device 140 (e.g., fusion and tracking application 146 of monitoring device 140) stores associations between the active identification tag and the one or more passive identification tags assigned to the active identification tag at block 402 are stored in a memory, such as in a database, in an embodiment.

At block 406, signals indicative of location of the active identification tag are received. For example, signals indicative of location of the active identification tag 102 are received by monitoring device 140 from ones of active tag readers 112 as the active identification tag 104 move throughout active tracking area 116.

At block 408, location of the active identification tag is tracked based on the signals received at block 406. For example, monitoring device 140 tracks location of the active identification tag 102 as the active identification 102 move in the active tracking are 116.

At block 410, location of the one or more passive identification tags assigned to the active identification tag at block 402 is tracked using the location of the active identification tag tracked at block 408. For example, monitoring device 140 tracks location of the one or more passive identification tags assigned to the active identification tag at block 402 using the location of the active identification tag tracked at block 408. In an embodiment, location of the one or more passive identification tags assigned to the active identification tag at block 402 is tracked using the location of the active identification tag tracked at block 408 is tracked based on (i) the location of the active identification tag tracked at block 406 and (ii) the association between the active identification tag and the assigned passive identification tag stored at block 404.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. For example, a specific example of hand tools are given, but the invention may be used for real-time tracking of any asset tagged with a passive RFID tag in a supply chain or asset management system. Other structures, configurations, and implementations consistent with the scope of the claimed invention will be apparent to those skilled in the art from a consideration of the specification or practice of the invention disclosed herein.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of a monitoring system have been described herein in terms of "modules" or "components," it is noted that that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A method for tracking location of passive identification tags, the method comprising:
    assigning, with a monitoring device, at least one passive identification tag to an active identification tag, the active identification tag having a power source and an antenna;
    storing, with the monitoring device in a computer memory, associations between the active identification tag and the at least one passive identification tags assigned to the active identification tag;
    receiving, with the monitoring device, one or more signals indicative of location of the active identification tag;
    tracking, with the monitoring device based on received one or more signals, location of the active identification tag as the active identification tag moves in an active tracking area; and
    tracking, with the monitoring device, location of the at least one passive identification tags, assigned to the active identification tag, based on i) the tracked location of the active identification tag and ii) the association between the active identification tag and the assigned passive identification tag,
    wherein assigning the at least one passive identification tag to the active identification tag comprises:
        assigning the passive identification tag to the active identification tag in response to detecting that the active identification tag is in proximity with the passive identification tag;
        after assigning the passive identification tag to the active identification tag, determining, with the monitoring device, that the passive identification tag is present in a prescribed area associated with the passive identification tag; and
        in response to determining that the passive identification tag is present in the prescribed area, disassociating, with the monitoring device, the passive identification tag from the active identification tag.

2. The method of claim 1, wherein assigning the passive identification tag to the active identification tag comprises assigning the passive identification tag to the active identification tag further in response to determining that the passive identification tag is absent from the prescribed area associated with the passive identification tag.

3. The method of claim 1, further comprising displaying, with the monitoring device, the tracked location of the at least one passive identifier tag in relation to the tracked location of the active identifier tag.

4. The method of claim 1, wherein assigning the at least one passive identification tag to the active identification tag comprises assigning multiple passive identification tags to the active identification tags.

5. The method of claim 1, wherein each of one or both of i) the at least one passive identification tag and ii) the active identification tag is a radio frequency identification (RFID) tag.

6. The method of claim 1, wherein each of one or both of i) the at least one passive identification tag and ii) the active identification tag is a Bluetooth low energy (BLE) tag.

7. A method for tracking location of passive identification tags, the method comprising:
assigning, with a monitoring device, at least one passive identification tag to an active identification tag, the active identification having a power source and an antenna;
storing, with the monitoring device in a computer memory, associations between the active identification tag and the at least one passive identification tags assigned to the active identification tag;
receiving, with the monitoring device, one or more signals indicative of location of the active identification tag;
tracking, with the monitoring device based on received one or more signals, location of the active identification tag as the active identification tag moves in an active tracking area;
tracking, with the monitoring device, location of the at least one passive identification tags, assigned to the active identification tag, based on i) the tracked location of the active identification tag and ii) the association between the active identification tag and the assigned passive identification tag;
associating, at the monitoring device, the at least one passive identifier tag with an asset and
associating, at the monitoring device, the active identifier tag with an issuable asset, the issuable asset comprising one or more of i) a person handling the asset and ii) a container for carrying the asset,
wherein associating the at least one passive identifier tag with the asset comprises associating the passive identification tag with an identifier of a tool to which the passive identification tag is attached,
wherein associating the active identifier tag with the issuable asset comprises associating the active identification tag with an identifier of the issuable asset.

8. A system, comprising
a database for storing identification data, and
a monitoring device coupled to the database, the monitoring device comprising one or more integrated circuits configured to:
assign at least one passive identification tag to an active identification tag, the active identification tag having a power source and an antenna;
store, in the database, associations between the active identification tag and the at least one passive identification tags assigned to the active identification tag;
receive one or more signals indicative of location of the active identification tag;
track, based on received one or more signals, location of the active identification tag as the active identification tag moves in a tracking area; and
track location of the at least one passive identification tags, assigned to the active identification tag, based on i) the tracked location of the active identification tag and ii) the association between the active identification tag and the assigned passive identification tag,
wherein the one or more integrated circuits configured to assign the at least one passive identification tag to the active identification tag are further configured to;

assign the passive identification tag to the active identification tag in response to detecting that the active identification tag is in proximity to the passive identification tag;
after assigning the passive identification tag to the active identification tag, determine that the passive identification tag is present in a prescribed area associated with the passive identification tag, and
in response to determining that the passive identification tag is present in the prescribed area, disassociate the passive identification tag from the active identification tag.

9. The system of claim 8, wherein the one or more integrated circuits are configured to assign the passive identification tag to the active identification tag further in response to determining that the passive identification tag is absent from the prescribed area associated with the passive identification tag.

10. The system of claim 8, wherein the one or more integrated circuits are further configured to display the tracked location of the at least passive identifier tag in relation to the tracked location of the active identifier tag.

11. The system of claim 8, wherein the one or more integrated circuits are configured to at assign multiple passive identification tags to the active identification tags.

12. The system of claim 8, wherein each of one or both of i) the at least one passive identification tag and ii) the active identification tag is a radio frequency identification (RFID) tag.

13. The system of claim 8, wherein each of one or both of i) the at least one passive identification tag and ii) the active identification tag is a Bluetooth low energy (BLE) tag.

14. A tangible, non-transitory computer readable medium, or media, storing machine readable instructions that, when executed by one or more processors, cause the one or more processors to:
assign at least one passive identification tag to an active identification tag, the active identification tag having a power source and an antenna,
store, in a memory, associations between the active identification tag and the at least one passive identification tags assigned to the active identification tag,
process one or more signals indicative of a location of the active identification tag, and
track, based on processing the one or more signals, location of the active identification tag as the active identification tag moves in an active tracking area; and
track location of the at least one passive identification tags, assigned to the active identification tag, based on i) the tracked location of the active identification tag and ii) the association between the active identification tag and the assigned passive identification tag,
wherein the machine readable instructions that, when executed by one or more processors, cause the one or more processors to assign the at least one passive identification tag comprises:
assigning the passive identification tag to the active identification tag in response detecting that the active identification tag is in proximity to the passive identification tag;
after assigning the passive identification tag to the active identification tag, determine that the passive identification tag is present in the prescribed area, and in response to determining that the a least one passive identification tag is present in the prescribed area, disassociate the passive identification tag from the active identification tag.

15. The tangible, non-transitory computer readable medium, or media of claim 14, storing machine readable instructions that, when executed by one or more processors, cause the one or more processors to assign the passive identification tag to the active identification tag further in response to determining that the passive identification tag is absent from the prescribed area associated with the passive identification tag.

16. The tangible, non-transitory computer readable medium, or media of claim 14, storing machine readable instructions that, when executed by one or more processors, cause the one or more processors to assign multiple passive identification tags to the active identification tags.

* * * * *